Oct. 12, 1948.    G. G. McNAMARA, JR    2,450,977
VEHICLE REACH AND HOUND CONSTRUCTION
Filed July 16, 1946
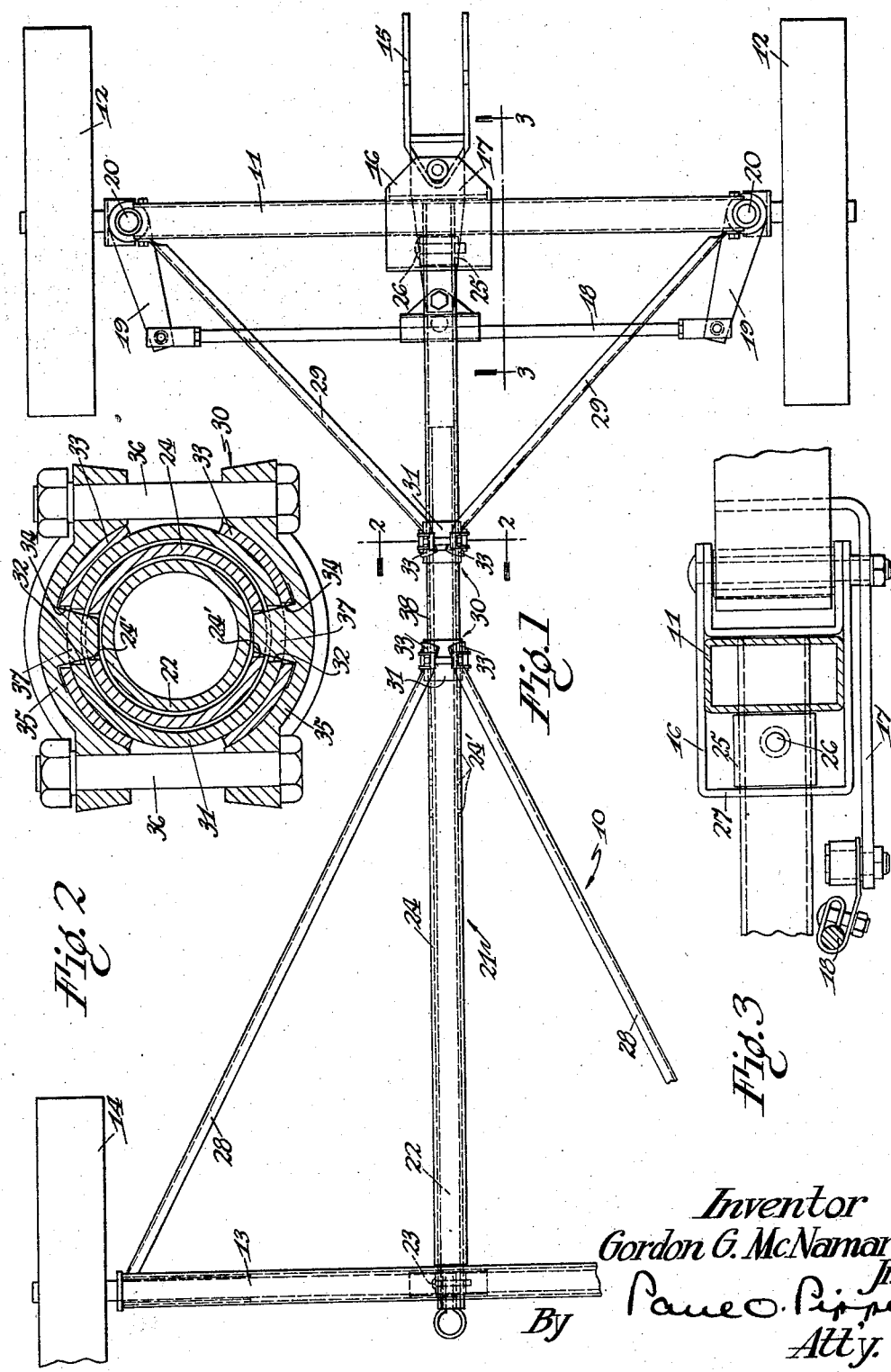
Inventor
Gordon G. McNamara,
Jr.
By Paul O. Pippel
Atty.

Patented Oct. 12, 1948

2,450,977

UNITED STATES PATENT OFFICE 2,450,977

VEHICLE REACH AND HOUND CONSTRUCTION

Gordon G. McNamara, Jr., Chicago, Ill., assignor to International Harvester Company, a corporation of New Jersey Application July 16, 1946, Serial No. 683,841

11 Claims. (Cl. 280—142)

This invention relates to a vehicle and particularly to a vehicle of the type commonly known as an all-purpose truck or trailer. More specifically it relates to a reach and hound construction for a vehicle.

It is an object of this invention to provide an improved reach and hound contruction for a vehicle, said construction being of simple design, of comparatively light weight, and inexpensive to maintain.

It is another object to provide an improved means for connecting the hound members of a vehicle to a central longitudinal reach, said connection being rigid with respect to longitudinal movement, yet flexible in torsion so that the hound members are readily flexed upon the oscillation of the front and rear axles of the vehicle.

It is another object to provide an improved reach and hound construction for a vehicle wherein the hounds are connected to a longitudinal reach against longitudinal movement, the end portions of said hounds being connected to said reach in a manner to provide for a maximum torsional flexibility during oscillation of the axles of said vehicle.

It is still another object to provide an improved means for connecting the ends of a pair of vehicle hound members of channel construction to a longitudinal reach, said means providing a maximum of torsional flexibility in said hounds during oscillation of the axles of said vehicle.

A complete understanding of the invention may be had from the following detailed description taken in connection with the accompanying sheet of drawing, in which:

Figure 1 is a plan view of a vehicle having a reach and hound construction embodying the principles of the invention.

Figure 2 is a sectional view taken along the line 2—2 of Figure 1, showing a clamping means for connecting the hounds of said vehicle to the vehicle reach.

Figure 3 is a sectional view taken along the line 3—3 of Figure 1, showing the connecting means of a longitudinal reach to the forward transverse axle of a vehicle.

For the purpose of illustration, a vehicle generally designated by the reference character 10 is shown in Figure 1. This vehicle may be of the type known as an all-purpose trailer, such a vehicle generally being utilized in the handling of agricultural or similar products. The vehicle 10 includes a front transverse axle 11 carried on ground wheels 12 and a rear transverse axle 13 carried on ground wheels 14, only one of which is shown. The front wheels 12 are steered by means of a draft tongue 15 pivotally connected to a box structure 16 which is centrally and rigidly mounted on the axle 11. The draft tongue 15 is connected to actuate a steering arm 17 connected to a transverse tie rod 18. The tie rod 18 is connected at its ends to steering members 19 which are connected to pivotal means 20 adapted to steer the wheels 12. The steering mechanism is of the conventional type, and further description thereof is not deemed necessary.

A reach means is generally indicated at 21 and consists of an inner tube or telescoping member 22 rigidly connected to the rear axle by means of a pin 23. The inner member 22 is axially movable within an outer tubular member 24 having a plurality of longitudinally spaced openings 24'. The outer tubular member 24 extends at its front end through the box 16, through the axle 11, and is free to journal or pivot therein. A collar 25 is rigidly secured to the member 24 by means of a pin 26. The collar 25 is positioned between a vertical member 27 of the box 16 and the axle 11 and functions to retain the outer member 24 against longitudinal movement with respect to the axle 11. It can thus be seen that the outer member 24 is free to pivot with respect to the axle 11 but is otherwise securely carried thereon. A pair of hounds or diagonal braces 28 are rigidly secured to the rear axle and extend forwardly thereof for connection to the outer tubular member 24. A pair of hounds 29 are rigidly secured to the forward axle 11 and extend rearwardly thereof for similar connection to the outer tubular member 24.

A pair of clamping members are generally designated by the reference character 30. Each clamping member 30 consists of a collar 31 encircling said outer member 24 and longitudinally movable on said member to a plurality of selected positions. The collar 31 is provided with openings 32. Each hound 28 is provided at its end with a semi-circular portion 33 having openings 34. The semi-circular portions 33 partially encircle and co-extend with the outer periphery of the collar 31, so that the openings 34 are in alinement with the openings 32 and 24' in the collar 31 and the outer member 24 respectively. A pair of semi-circular clamping segments 35 are rigidly secured together by means of fastening means or bolts 36. Each clamping segment 35 is provided with a radially inwardly extending projection 37 which projects through the alined openings 24', 32, and 34.

The clamping members 35 may be selectively positioned at any position along the outer member by respective axial movement of the inner member 22 and the outer member 24, thereby adjusting the longitudinal position of the transverse axles 11 and 13. It can be seen that by virtue of the cooperation of the projections 37 with the openings of the outer member, the collar, and the end portions of the hounds a construction is obtained which securely connects the hounds to the reach members against longitudinal movement. In vehicles of the type under consideration it is extremely necessary that the hounds are sufficiently flexible in torsion to permit the free oscillation of the front and rear axles. This is fully achieved by the manner in which the hounds are connected to the longitudinal reach. Each opening 34 in the ends of the hounds is sufficiently oversize with respect to the projection 37 so that a limited amount of movement therebetween is effected. Oscillatory movement of the axles will place the hounds in torsion, and by virtue of this connection the end portions 33 of the hounds are free to flex sufficiently so that the maximum torsional action of the hounds is achieved. Thus the torsional movement is absorbed almost completely in the hound members rather than in the part of the reach members indicated by the reference character 38. It can readily be seen that the portion of the reach 38 is of insufficient length to permit proper absorption of the torsional stresses and that the applicant's construction adequately compensates for this insufficiency.

The free torsional movement of the hounds can readily be increased by simply unloosening the bolts 36 so that the greater relative movement between the end portions 33 and the collar 31 is possible. This is of prime importance since it permits adjustment of the connection between the hounds and the reach under all conditions which might be met in the use of the vehicle. Regardless of the relative tightness of the bolts 36, the hounds are rigid with respect to the reach during longitudinal draft forces, yet sufficiently flexible to absorb torsional forces caused by oscillation of the axles.

From the foregoing description it will be seen that an improved reach and hound construction for a vehicle has been provided, the particular features residing in the novel manner in which the hounds are connected to the longitudinal reach member.

It will be understood that various modifications and alterations may be made in this construction without departing from the spirit of the invention nor the scope thereof as defined in the appended claims.

What is claimed is:

1. A vehicle comprising front and rear transverse axles, a longitudinal reach means between said axles including a first and second reach part connected together for relative longitudinal adjustment, hound members connected to said axles and extending angularly for connection to said reach means, said hound members and said first reach part having alined openings, a clamping means, and a radially inwardly extending member associated with said clamping means, said member engaging said alined openings and constructed and arranged to lock said hounds against longitudinal movement with respect to said first reach part.

2. A vehicle having first and second transverse axles, telescoping reach means between the axles including inner and outer axially movable members, a collar carried by said outer member for adjustment longitudinally to selective positons on said reach means, a pair of hounds connected to said first axle, said hounds being provided with end portions engaging said collar, and means connecting said end portions and said collar to said outer member comprising a pair of clamping segments encircling said end portions, said clamping segments having projections engaging said end portions and said outer movable member to relatively secure the same against longitudinal movement.

3. A vehicle having first and second transverse axles, telescoping longitudinal reach means between the axles including inner and outer axially movable members, a collar carried by said outer member for adjustment longitudinally to selective positions on said reach means, a pair of hounds connected to said first axle, said hounds being provided with semi-circular end portions, clamping segments connecting said collar and said end portions, said end portions, collar, and outer member having alined openings, and a projection extending radially through said openings for locking said collar and said end portions against longitudinal movement with respect to said outer member.

4. A vehicle having first and second transverse axles, telescoping longitudinal reach means between the axles including inner and outer axially moveable members, means pivotally connecting said outer member to said first axle, a collar carried by said outer member for adjustment longitudinally to selective positions on said reach means, a pair of hounds connected to said first axle, said hounds being provided with end portions, semi-circular clamping segments connecting said collar and said end portions, said end portions, collar, and outer member having alined openings, and a projection associated with said reach means, said projection extending radially through said openings for locking said collar and end portions against longitudinal movement with respect to said outer member.

5. A vehicle having first and second transverse axles, telescoping longitudinal reach means between the axles including inner and outer axially movable members, a collar carried by said outer member for adjustment longitudinally to selective positions on said reach means, a pair of hounds connected to said first axle, said hounds being provided with end portions, semi-circular clamping segments connecting said collar and said end portions, said end portions, collar, and outer member having alined openings, and a projection extending radially through said openings for locking said collar and end portions against pivotal and longitudinal movement with respect to said outer member.

6. A vehicle having first and second transverse axles, telescoping longitudinal reach means between the axles including inner and outer axially movable members, means pivotally connecting said outer member to said first axle, a collar carried by said outer member for adjustment longitudinally to selective positions on said reach means, a pair of hounds connected to said first axle, said hounds being provided with end portions, semi-circular clamping segments connecting said collar and said end portions, said end portions, collar, and outer member having alined openings, and a projection extending radially through said openings for locking said collar and end portions against pivotal and longitudinal movement with respect to said outer member.

7. A vehicle having first and second transverse axles, telescoping longitudinal reach means between the axles including inner and outer axially movable members, means pivotally connecting said outer member to said first axle, means connecting said inner member to said second axle, a pair of collars carried by said outer member for adjustment longitudinally to selective positions on said reach means, a pair of hounds connected to each transverse axle, said hounds being provided with semi-circular end portions engaging said collars, and clamping members encircling said end portions and said collars, said clamping members being constructed and arranged to secure said hounds against longitudinal and pivotal movement with respect to said outer member.

8. A vehicle having front and rear transverse axles, a telescoping longitudinal reach means between the axles including longitudinal inner and outer axially movable members, said outer member having a plurality of longitudinally spaced openings, means pivotally connecting said outer member to the front axle, a pair of hounds extending from the outer member and respectively connected to the front and rear axles, means securing each of said hounds to said outer member against relative longitudinal and pivotal movement comprising, a collar telescopingly associated with said outer member, said collar member being provided with an opening adapted to be selectively placed to register with any of said openings of said outer member, a pair of complementary clamping members encircling said collar member and the end portions of said hounds, a projection connected to each clamping member, said projections extending through said collar member and said openings in said outer member, and means for securing said clamping members.

9. A vehicle having first and second transverse axles, telescoping longitudinal reach means between the axles including inner and outer axially movable members, a pair of hounds connected to each axle, means securing each hound to said outer member against relative longitudinal movement comprising, a collar associated with said outer member and adapted to be selectively longitudinally positioned thereon, a pair of complementary clamping members encircling said collar member, projections on said clamping members; said outer member, said collar and said hounds having openings registering with one another for engaging said projections, and means for adjustably securing said clamping members with respect to one another.

10. A vehicle having first and second transverse axles, telescoping longitudinal reach means between the axles including inner and outer axially movable members, means connecting said outer and said inner members to said first and second axles respectively, a pair of hounds connected to each axle, means rigidly securing each hound to said outer member against relative longitudinal and pivotal movement comprising, a collar associated with said outer member and adapted to be selectively longitudinally positioned thereon, a pair of complementary clamping members encircling said collar member, projections on said clamping members; said outer member, said collar and said hounds having openings registering with one another for engaging said projections, and means for securing said clamping members with respect to one another.

11. A vehicle having front and rear transverse axles, a telescoping longitudinal reach means between the axles including longitudinal inner and outer axially movable members, said outer member having a plurality of longitudinally spaced openings, means connecting said inner member to the rear axle, means pivotally connecting said outer member to the front axle, a pair of hounds extending from the outer member and respectively connected to the front and rear axles, means rigidly securing each of said hounds to said outer member against relative longitudinal movement comprising, a collar telescopingly associated with said outer member, said collar member being provided with an opening adapted to be selectively placed to register with any of said openings of said outer member, a pair of complementary clamping members encircling said collar member and the end portions of said hounds, a projection connected to each clamping member, said projections extending through the end portions of said hounds and said openings, and adjustable tensionable means for securing said clamping members about said longitudinal reach.

GORDON G. McNAMARA, Jr.

REFERENCES CITED

The following references are of record in the file of this patent:

UNITED STATES PATENTS

| Number | Name | Date |
|---|---|---|
| 1,085,038 | Hall | Jan. 20, 1914 |
| 2,115,566 | Voorhees | Apr. 26, 1938 |
| 2,330,299 | McNamara | Sept. 28, 1943 |